United States Patent
Spierling et al.

(10) Patent No.: US 11,060,449 B2
(45) Date of Patent: Jul. 13, 2021

(54) INTEGRATED TURBO-COMPRESSOR WITH VARIABLE GEAR RATIO TRANSMISSION FOR INTERNAL COMBUSTION ENGINE

(71) Applicant: Hamilton Sundstrand Corporation, Charlotte, NC (US)

(72) Inventors: Todd A. Spierling, Rockford, IL (US); David S. Behling, Belvidere, IL (US); Glenn C. Lemmers, Jr., Loves Park, IL (US); Jean Thomassin, Ste Julie (CA)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/431,084

(22) Filed: Jun. 4, 2019

(65) Prior Publication Data
US 2020/0386149 A1    Dec. 10, 2020

(51) Int. Cl.
| | |
|---|---|
| *F02B 39/04* | (2006.01) |
| *F02B 37/16* | (2006.01) |
| *F02B 39/10* | (2006.01) |
| *F16H 3/72* | (2006.01) |
| *F02B 39/08* | (2006.01) |
| *H02K 7/18* | (2006.01) |

(52) U.S. Cl.
CPC ............ *F02B 39/04* (2013.01); *F02B 37/166* (2013.01); *F02B 39/08* (2013.01); *F02B 39/10* (2013.01); *F16H 3/728* (2013.01); *H02K 7/1815* (2013.01); *Y02T 10/12* (2013.01)

(58) Field of Classification Search
CPC ......... F02B 37/00–24; F02B 39/00–16; Y02T 10/144; Y02T 10/163
See application file for complete search history.

(56) References Cited

U.S. PATENT DOCUMENTS

| | | | |
|---|---|---|---|
| 2,585,968 A | | 2/1952 | Schneider |
| 4,312,183 A | * | 1/1982 | Regar ................... F02B 37/10 60/608 |
| 4,729,225 A | * | 3/1988 | Bucher ................ F02B 37/005 60/608 |

(Continued)

FOREIGN PATENT DOCUMENTS

| | | | | |
|---|---|---|---|---|
| DE | 102013000495 B3 | | 3/2014 | |
| GB | 206845 A | * | 2/1924 | ............ F02B 37/105 |

OTHER PUBLICATIONS

Extended European Search Report; Application No. 19211660.6; dated May 27, 2020; 68 pages.

*Primary Examiner* — Laert Dounis
(74) *Attorney, Agent, or Firm* — Cantor Colburn LLP

(57) ABSTRACT

An integrated turbo-compressor includes a compressor with a compressor outlet, a turbine with a turbine inlet, the turbine operatively connected to the compressor by an interconnect shaft, and a compounding drive. The compounding drive is connected to the turbine and has a variable gear ratio and an output member, the variable gear ratio coupling the turbine to the output member to compound output of an internal combustion engine using energy recovered from an exhaust flow received from the internal combustion engine and in excess of energy required to compress combustion air provided to the internal combustion engine. Internal combustion engines, aircraft, and methods of compounding output of internal combustion engines are also described.

8 Claims, 6 Drawing Sheets

(56) References Cited

U.S. PATENT DOCUMENTS

| | | | | |
|---|---|---|---|---|
| 5,713,204 | A * | 2/1998 | Kadlicko | F02B 37/10 |
| | | | | 60/605.1 |
| 5,890,468 | A * | 4/1999 | Ozawa | F02B 37/005 |
| | | | | 123/561 |
| 6,050,094 | A | 4/2000 | Udd et al. | |
| 7,055,507 | B2 | 6/2006 | Kelley, Jr. | |
| 7,490,594 | B2 | 2/2009 | Van Dyne et al. | |
| 8,261,550 | B2 * | 9/2012 | Sartre | B60K 6/365 |
| | | | | 60/607 |
| 8,366,412 | B2 | 2/2013 | Grethel et al. | |
| 8,561,403 | B2 | 10/2013 | Van Dyne et al. | |
| 9,581,078 | B2 * | 2/2017 | Brinks | F02M 26/02 |
| 2006/0032225 | A1 * | 2/2006 | Dyne | F16H 61/42 |
| | | | | 60/607 |
| 2009/0173318 | A1 * | 7/2009 | Grethel | F02B 39/04 |
| | | | | 123/561 |
| 2018/0215246 | A1 * | 8/2018 | Franke | F02B 63/04 |

\* cited by examiner

INTEGRATED TURBO-COMPRESSOR WITH VARIABLE GEAR RATIO TRANSMISSION FOR INTERNAL COMBUSTION ENGINE

BACKGROUND

The present disclosure generally relates to engines, and more particularly to turbo-compounded engines having integrated turbo-compressors.

Engines, such as internal combustion engines, commonly employ turbochargers. Turbochargers compress air prior to admission to the engine for combustion, generally using residual energy recovered from the exhaust gases issued by the engine during operation. Such turbocharges allow an engine to generate greater output power for a given engine size than otherwise possible, typically with greater efficiency than a non-turbocharged and otherwise equivalent engine.

In some engines the residual energy recovered from the exhaust gases issuing from the engine can exceed the input energy necessary to compress the air for the engine combustion process. To more fully utilize this energy and further improve engine efficiency, compounding can be employed. Compounding is technique of augmenting engine efficiency by returning energy recovered from the engine exhaust that is otherwise unused by a turbocharger, generally through gearing coupling the turbocharger to the engine. The gearing typically employs a fixed gear ratio, which is selected to return some of the otherwise unused energy to the engine over the operating range of the engine.

Such systems and methods have generally been suitable for their intended purpose. However, there remains a need for improved turbo-compressors, internal combustion engines, and methods of operating internal combustion engines. The present disclosure provides a solution to this need.

BRIEF DESCRIPTION

Disclosed is an integrated turbo-compressor. The integrated turbo-compressor includes a compressor with a compressor outlet, a turbine with a turbine inlet, the turbine operatively connected to the compressor by an interconnect shaft, and a compounding drive. The compounding drive is connected to the turbine and having a variable gear ratio and an output member, wherein the variable gear ratio couples the turbine to the output member to compound output of an internal combustion engine using energy recovered from an exhaust flow received from the internal combustion.

In addition to one or more of the features described above, or as an alternative, further embodiments may include that the compounding drive comprises a variable ratio hydraulic pump/motor set.

In addition to one or more of the features described above, or as an alternative, further embodiments may include that the compounding drive also includes an input member connected to the turbine, an output member connected to the input member, and an intermediate member connecting the input member to the output member through an epicyclical gear arrangement and a hydraulic pump/motor set.

In addition to one or more of the features described above, or as an alternative, further embodiments may include that the compounding drive comprises a hydraulic pump/motor set connecting the turbine to the output member.

In addition to one or more of the features described above, or as an alternative, further embodiments may include that the hydraulic pump/motor set comprises a variable displacement hydraulic module, the compounding drive further comprising an input member operably connecting the turbine to fixed displacement hydraulic module.

In addition to one or more of the features described above, or as an alternative, further embodiments may include that the hydraulic pump/motor set comprises a variable displacement hydraulic module, wherein the output member is operably connected to the variable displacement hydraulic module.

In addition to one or more of the features described above, or as an alternative, further embodiments may a controller operably connected to the hydraulic pump/motor set and disposed in communication with an engine output shaft to match speed of the compounding drive to rotational speed of the engine output shaft.

In addition to one or more of the features described above, or as an alternative, further embodiments may include that the compounding drive comprises an epicyclical gear arrangement connecting the turbine to the output member.

In addition to one or more of the features described above, or as an alternative, further embodiments may include that the epicyclical gear arrangement is arranged within a housing; the epicyclical gear arrangement additionally includes a sun gear first in rotation relative to the turbine, a ring gear extending about the sun gear, two or more planetary gears intermeshed with the sun gear and the ring gear, and a planetary gear carrier supporting each of the planetary gears for rotation independent rotation relative to one another, the planetary gear carrier fixed in rotation relative to the output member; and that the sun gear, the ring gear, and the planetary gear carrier are each supported for rotation relative to the housing.

In addition to one or more of the features described above, or as an alternative, further embodiments may include that the compounding drive also includes an input member connected to the turbine and an intermediate member connected to the output member, the epicyclical gear arrangement connecting the output member and the intermediate member to the input member.

In addition to one or more of the features described above, or as an alternative, further embodiments may include that the compounding drive comprises a continuously variable transmission connecting the interconnect shaft to the output member.

In addition to one or more of the features described above, or as an alternative, further embodiments may include that the compounding drive comprises a traction drive assembly connecting the interconnect shaft to the output member.

In addition to one or more of the features described above, or as an alternative, further embodiments may include that the turbine has fixed turbomachinery geometry, wherein the compressor has fixed turbomachinery geometry.

Also disclosed is an internal combustion engine. The internal combustion engine includes an engine body supporting an engine output shaft and having a combustion air intake port and an exhaust port, and an integrated turbo-compressor as described above. The compressor outlet is connected to the combustion air intake port and the turbine inlet is connected to the engine exhaust port.

In addition to one or more of the features described above, or as an alternative, further embodiments may include that the internal combustion engine is a constant speed turbo-compounded engine or wherein the internal combustion engine is a variable speed turbo-compounded engine.

In addition to one or more of the features described above, or as an alternative, further embodiments may include an electric motor and battery arrangement operatively connected to the engine output shaft in an hybrid-electric turbo-compounded engine arrangement.

In addition to one or more of the features described above, or as an alternative, further embodiments may include that an carries an integrated turbo-compressor as described above, the turbo-compressor operably connected to a rotor.

Additionally disclosed is a method of compounding output of an internal combustion engine. The method includes, at an integrated turbo-compressor as described above, receiving an engine exhaust flow from an internal combustion engine at the turbine inlet and extracting work from the engine exhaust flow with the turbine. A first extracted work portion is applied to the compressor to compress a flow of combustion air for the internal combustion engine. A second portion of the extracted work portion is applied to the internal combustion engine to compound output of the internal combustion engine, applying the second portion of the extracted work additionally including varying the variable gear ratio while compounding the output of the internal combustion engine.

In addition to one or more of the features described above, or as an alternative, further embodiments may include varying the variable gear ratio of the compounding drive while rotating an engine output shaft of the engine at a fixed rotational speed.

In addition to one or more of the features described above, or as an alternative, further embodiments may include varying the variable gear ratio of the compounding drive while varying rotational speed of an engine output shaft.

Technical effects of the present disclosure include turbo-compounded engines having variable gear ratios. The variable gear ratio varies continuously, allowing the speed of the turbo-compressor to be independent of the engine speed and allowing the turbo-compounded engine to operation over a range of speeds and/or altitudes. In certain embodiments the turbine and/or the compressor can have fixed turbomachinery geometry, simplifying the arrangement of the turbine and/or the compressor while allowing the turbo-compounded engine to operation over a range of speeds and/or altitudes.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
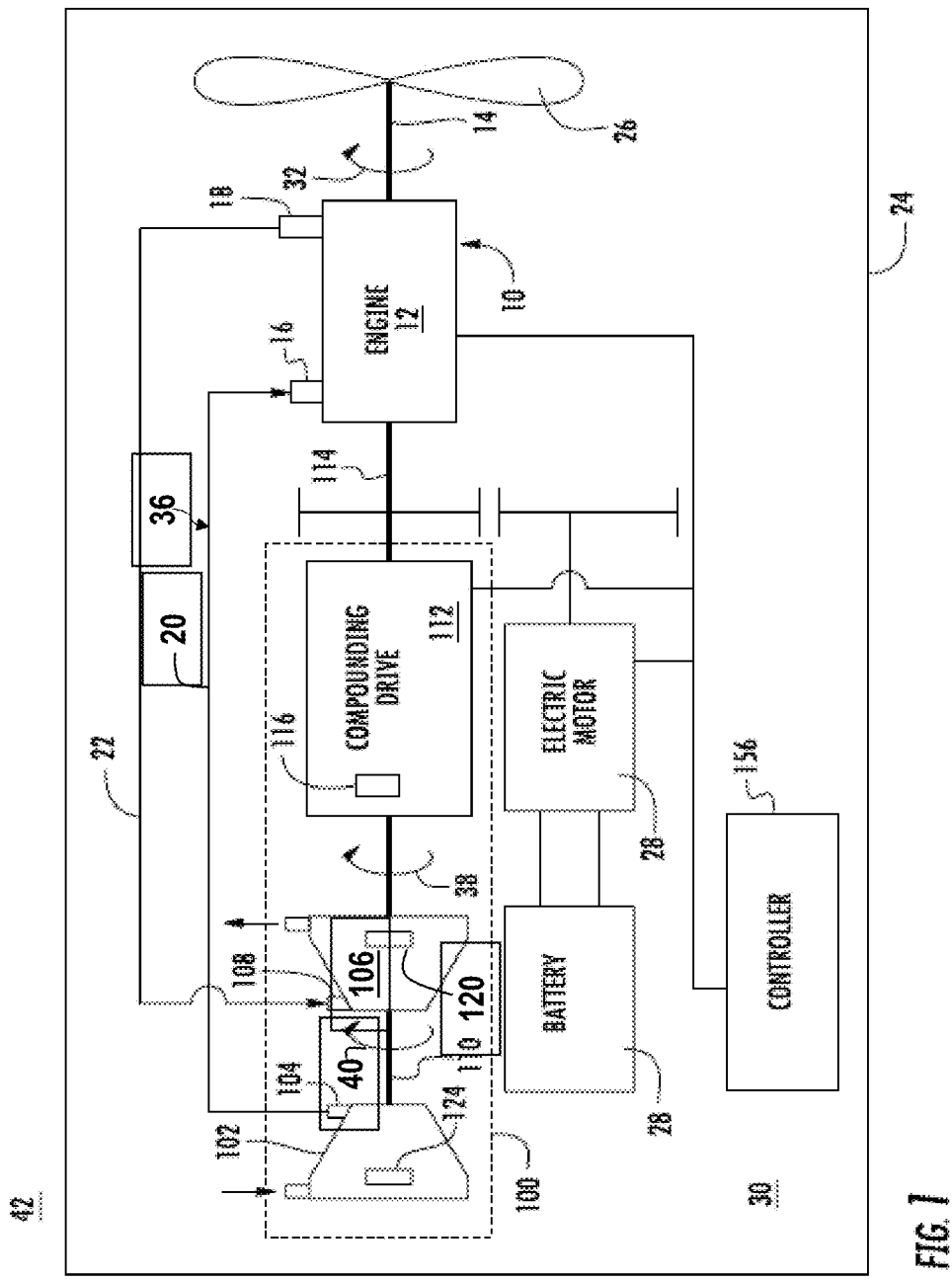
FIG. 1 is a schematic view of an integrated turbo-compressor constructed in accordance with the present disclosure, showing the integrated turbo-compressor connected to an internal combustion engine by a compounding drive having a variable gear ratio.

Reference with now be made to the drawings wherein like reference numerals identify similar structural features or aspects of the subject disclosure. For purposes of explanation and illustration, and not limitation, a partial view of an exemplary embodiment of an integrated turbo-compressor in accordance with the disclosure is shown in FIG. 1 and is designated generally by reference character 100. Other embodiments of integrated turbo-compressors, internal combustion engines with integrated turbo-compressors, and methods of compounding output of internal combustion engines, are provided in FIGS. 2-6, as will be described. The systems and methods described herein can be used compounding engines carried by vehicles, such as turbo-compounded hybrid-electric engines in aircraft, though the present disclosure is not limited to any particular type of engine or to aircraft in general.

Referring to FIG. 1, an internal combustion engine 10, e.g., a gasoline engine or a diesel internal combustion engine, is shown. The internal combustion engine 10 includes an engine body 12, an engine output shaft 14, a combustion air intake port 16, and an engine exhaust port 18. The engine body 12 supports the engine output shaft 14, which can be a crank shaft, for rotation relative to the engine body 12. The combustion air intake port 16 is connected to the integrated turbo-compressor 100 and is configured to receive therefrom a flow of compressed combustion air 20. The exhaust port 18 is connected to the integrated turbo-compressor 100 is configured to communicate thereto an exhaust flow 22, e.g., a combustion product flow.

The internal combustion engine 10 is carried by an aircraft 24, a rotor 26, e.g., a propeller or a rotor disk, is operably connected to the engine output shaft 14, and an electric motor and battery arrangement 28 is operably connected to the internal combustion engine 10 in a hybrid-electric turbo-compounded engine arrangement 30. This is for illustration purposes only and is non-limiting. As will be appreciated by those of skill in the art, other types of internal combustion engines can also benefit from the present disclosure. In certain embodiment the internal combustion engine 10 is a constant speed turbo-compounded engine. In accordance with certain embodiments the internal combustion engine is a variable speed turbo-compounded engine.

The integrated turbo-compressor 100 generally includes a compressor 102 with a compressor outlet 104, a turbine 106 with a turbine inlet 108 operatively connected to the compressor by an interconnect shaft 110, and a compounding drive 112. The compounding drive 112 includes an output member 114 (shown in FIG. 2) and has a variable gear ratio 116 (shown in FIG. 2). The variable gear ratio 116 couples the output member 114 with the turbine 106 to compound power output 32 of the internal combustion engine 10, which is connected to the compressor outlet 104 and the turbine inlet 108, using a portion of recovered energy 36 from the exhaust flow 22 issued by internal combustion engine 10 and recovered by the turbine 106.

The turbine 106 is in fluid communication with the internal combustion engine 10 to receive therefrom the exhaust flow 22 and is configured to extract therefrom the recovered energy 36. In this respect the turbine inlet 108 is connected to an exhaust port 18 of the internal combustion engine 10 by an exhaust duct 118. It is contemplated that the turbine 106 have fixed turbomachinery geometry 120. For example, the turbine 106 can have one or more of fixed inlet guide vanes, fixed serial vanes, and/or fixed outlet vanes. This simplifies both the construction and the operation of the integrated turbo-compressor 100.

The compressor 102 is in fluid communication with the internal combustion engine 10 and the ambient environment 42. In this respect the compressor 102 is configured to ingest and compress air from the ambient environment 42 to form the compressed combustion air 20 using a first recovered energy portion 38 of the recovered energy 36 from the exhaust flow 22 provided by the turbine 106. The compressed combustion air 20 is communicated to the combustion air intake port 16 of the internal combustion engine 10, which is connected to the compressor outlet 104 by a compressed air duct 122. It is contemplated that the compressor 102 have fixed turbomachinery geometry 124. For example, the compressor 102 can have one or more of fixed inlet guide vanes, fixed serial vanes, and/or fixed outlet vanes. This also simplifies both the construction and the operation of the integrated turbo-compressor 100.

The interconnect shaft 110 connects the turbine 106 to the compressor 102. The interconnect shaft 110 also connects the turbine 106 to the compounding drive 112. In this respect the interconnect shaft 110 is configured to communicate the recovered energy 36 to the compressor 102 and the engine output shaft 14, respectively. More particularly, the interconnect shaft 110 communicates the first recovered energy portion 38 to the compressor 102 for compressing the compressed combustion air 20, and communicates a second recovered energy portion 40 to the engine output shaft 14 through the compounding drive 112 and through the variable gear ratio 116.

The compounding drive 112 couples the turbine 106 to engine output shaft 14 and thereby operably connects the turbine 106 to the internal combustion engine 10. In certain embodiments the compounding drive 112 includes a variable ratio hydraulic pump/motor set 130 (shown in FIG. 2) having the variable gear ratio 116. It is contemplated that the variable gear ratio 116 allow the internal combustion engine 10 to operate over a relatively wide range of speeds, temperatures, and/or altitudes. In certain embodiments the variable gear ratio 116 can also provide the integrated turbo-compressor 100 with a relatively simple arrangement in comparison to turbomachinery with variable geometry. In accordance with certain embodiments. The variable gear ratio 116 can provide the integrated turbo-compressor 100 with relatively high efficiency, high reliability, and/or a lightweight arrangement in comparison to alternative turbo-compressor arrangements.

Figure 2:
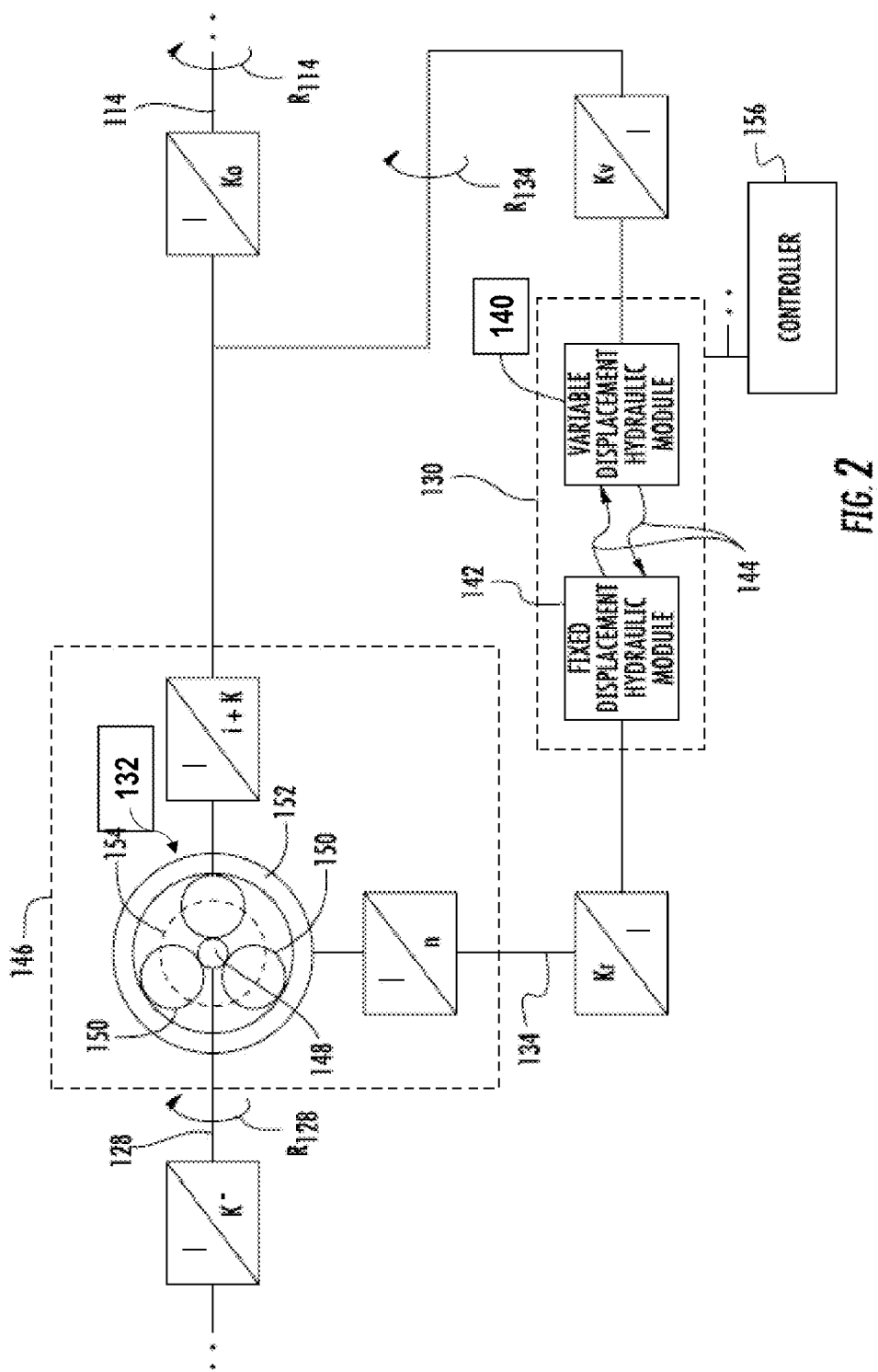
FIG. 2 is a schematic diagram of the compounding drive of FIG. 1 according to an embodiment, showing a variable ratio hydraulic pump/motor set with a hydraulic pump/motor set and epicyclical gear arrangement providing the variable gear ratio for a high-speed turbo-compressor.

With reference to FIG. 2, the compounding drive 112 is shown. The compounding drive 112 includes an input member 128, a hydraulic pump/motor set 130, an epicyclical gear arrangement 132. The compounding drive 112 also includes an intermediate member 134 and the output member 114.

The input member 128 is connected to the turbine 106 (shown in FIG. 1). More specifically, the input member 128 is connected to both the turbine 106 and the compressor 102 (shown in FIG. 1) through the interconnect shaft 110, and receives therefrom the second recovered energy portion 40 provided by the turbine 106.

The output member 114 is connected to the internal combustion engine 10 (shown in FIG. 1). More specifically, the output member 114 is connected to the engine output shaft 14 (shown in FIG. 1) to communicate the second recovered energy portion 40 provided by the turbine 106 (shown in FIG. 1) to the engine output shaft 14.

The epicyclical gear arrangement 132 connects the input member 128 to both the output member 114 and the intermediate member 134 via the hydraulic pump/motor set 130. In this respect the epicyclical gear arrangement 132 is configured as a subtraction module suitable for high-speed applications, i.e., applications where the turbine 106 (shown in FIG. 1) rotates are speeds greater than that of the engine output shaft 14 (shown in FIG. 1), and generally includes a housing 146, a sun gear 148, and two or more planetary gears 150. The epicyclical gear arrangement 132 also includes a ring gear 152 and a planetary gear carrier 154.

The sun gear 148 is supported for rotation relative to the housing 146 and is fixed in rotation relative to the input member 128. The two or more planetary gears 150 are intermeshed between the sun gear 148 and the ring gear 152, and each in turn supported for independent rotation relative to one another by the planetary gear carrier 154. The planetary gear carrier 154 is supported for rotation relative to the housing 146 and is fixed in rotation relative to the output member 114. The ring gear 152 is supported for rotation relative to the housing 146, is fixed in rotation relative to the intermediate member 134, and is connected therethrough to the hydraulic pump/motor set 130.

The hydraulic pump/motor set 130 connects the intermediate member 134 to the output member 114 and includes a fixed displacement hydraulic module 142 and a variable displacement hydraulic module 140. The fixed displacement hydraulic module 142 is in fluid communication with the variable displacement hydraulic module 140 through a hydraulic circuit 144, which fluidly connects the fixed displacement hydraulic module 142 with the variable displacement hydraulic module 140. The fixed displacement hydraulic module 142 is in turn operably associated with the intermediate member 134, and receives mechanical rotation therefrom for pressurizing hydraulic fluid within the hydraulic circuit 144.

The controller 156 is operatively connected to the hydraulic pump/motor set 130 for throttling flow of the hydraulic fluid through the hydraulic circuit 144, the fixed displacement hydraulic module 142 being operatively connected to variable displacement hydraulic module 140 through the hydraulic circuit 144. As also shown in FIG. 2, the variable displacement hydraulic module 140 is operatively connected to the output member 114 for applying power therethrough according to the hydraulic fluid received through the hydraulic circuit 144. It is contemplated that either (or both) the fixed displacement hydraulic module 142 and the variable displacement hydraulic module 140 may operate as hydraulic pump or motor according to the direction of hydraulic fluid through hydraulic circuit 144, as shown in FIG. 2 with the solid and dashed arrows identifying the hydraulic circuit 144.

During operation the turbine 106 (shown in FIG. 1) rotates the input member 128 at a rotational speed which varies according to the operating regime of the internal combustion engine 10 (shown in FIG. 1), e.g., according to throttle setting. Rotation of the input member 128 in turn rotates the sun gear 148, and thereby the planetary gear carrier 154 according to the rotational resistance presented by the ring gear 152 and communicated planetary gears 150. This reduces the rotational speed of the input member 128 by the rotational speed of the intermediate member 134. It is contemplated that the hydraulic circuit be reversible, the hydraulic circuit 144 thereby providing capability for speed trimming.

The hydraulic circuit 144 communicates pressurized hydraulic fluid to the variable displacement hydraulic module 140 according to the controller 156, which is configured to throttle flow of hydraulic fluid through the hydraulic circuit 144 to present rotation resistance to the input member 128 via the ring gear 152 and the intermeshed planetary gears 150 such that the planetary gear 154 carrier 154, and the therethrough the output member 114, rotate at the speed of the engine output shaft 14 (shown in FIG. 1), or slightly above the speed of the engine output shaft 14. Manipulation of hydraulic fluid flow through the hydraulic circuit 144, in cooperation with the speed subtraction provided by the epicyclical gear arrangement 132, provides the variable gear ratio 116 for compounding the internal combustion engine 10 (shown in FIG. 1) using the turbine 106 (shown in FIG. 1). In certain embodiments the controller 156 can include a passive governor module configured to drive the output member 114 to a predetermined engine output shaft speed, such as in embodiments wherein the internal combustion engine 10 is a constant speed internal combustion engine. In accordance with certain embodiments the controller 156 can include an active governor module configured to adjust the rotational speed of the output member 114 to the actual (or desired) speed of the engine output shaft 14, such as in embodiments wherein the internal combustion engine 10 is a variable speed internal combustion engine.

Figure 3:
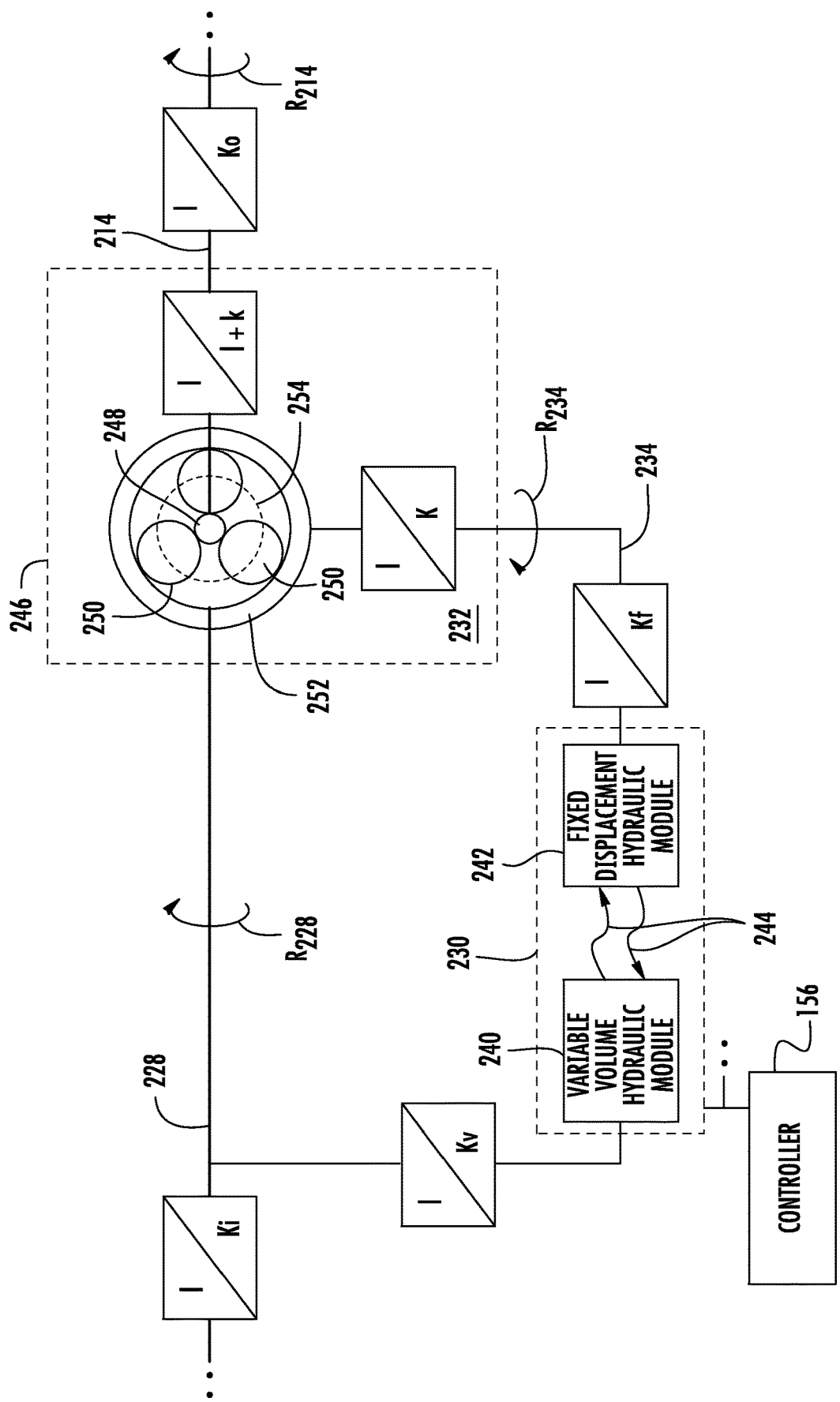
FIG. 3 is a schematic diagram of the compounding drive of FIG. 1 according to another embodiment, showing a variable ratio hydraulic pump/motor set with a hydraulic pump/motor set and epicyclical gear arrangement providing the variable gear ratio for a low-speed turbo-compressor.

With reference to FIG. 3, a compounding drive 212 is shown. The compounding drive 212 is similar to the compounding drive 112 (shown in FIG. 1) and is additionally configured for a slow-speed turbo-compressor, i.e., a turbo-compressor having a rotational speed that is lower than that of the engine which it compounds. In this respect the compounding drive 212 includes an input member 228, a hydraulic pump/motor set 230, an epicyclical gear arrangement 232. The compounding drive 212 also includes an intermediate member 234 and the output member 214.

The input member 128 is connected to the turbine 106 (shown in FIG. 1). More specifically, the turbine 106 and the interconnect shaft 110, and therethrough to the compressor 102 (shown in FIG. 1), and receives therefrom the second recovered energy portion 40 provided by the turbine 106.

The output member 214 is connected to the internal combustion engine 10 (shown in FIG. 1). More specifically, the output member 214 is connected to the engine output shaft 14 (shown in FIG. 1) to communicate the second recovered energy portion 40 provided by the turbine 106 (shown in FIG. 1) to the engine output shaft 14.

The hydraulic pump/motor set 230 connects the input member 228 to the output member 214 through the intermediate member 234 and epicyclical gear arrangement 232. In this respect the hydraulic pump/motor set 230 includes a variable displacement hydraulic module 240 and fixed displacement hydraulic module 242. The fixed displacement hydraulic module 242 is in fluid communication with the variable displacement hydraulic module 240 through a hydraulic circuit 244, which fluidly connects the variable displacement hydraulic module 240 with the fixed displacement hydraulic module 242. The fixed displacement hydraulic module 242 is connected to the intermediate member 234, and therethrough to the output member 214 through the epicyclical gear arrangement 232. The variable displacement hydraulic module 240 is connected to the input member 228, and therethrough to the turbine 106 (shown in FIG. 1). It is contemplated that either (or both) the variable displacement hydraulic module 240 and the fixed displacement hydraulic module 242 can operate as a hydraulic pump or a hydraulic motor, as required by the operation of the internal combustion engine 10 (shown in FIG. 1) and turbine 106 (shown in FIG. 1).

The epicyclical gear arrangement 232 is configured as a speed summation module and includes a housing 246, a sun gear 248, and two or more planetary gears 250. The epicyclical gear arrangement 232 also includes a ring gear 252 and a planetary gear carrier 254. The sun gear 248 is supported for rotation relative to the housing 246 and is fixed in rotation relative to the input member 228. The ring gear 252 is supported for rotation relative to the housing 246 and fixed in rotation relative to the intermediate member 234. The two or more planetary gears 150 are intermeshed between the sun gear 248 and the ring gear 252, and are supported for independent rotation relative to one another by the planetary gear carrier 254. The planetary gear carrier 254 is in supported for rotation relative to the housing 246 and is fixed in rotation relative to the output member 214. It is contemplated that the compounding drive 212 be constructed with gear construction relationships as shown in FIG. 3 in certain embodiments. This is for illustration purposes only and, as will be appreciated by those of skill in the art in view of the present disclosure, other gear construction relationships may be employed by the compounding drive 212.

During operation the turbine 106 (shown in FIG. 1) rotates the input member 228 at a rotational speed which varies according to the operating regime of the internal combustion engine 10 (shown in FIG. 1), e.g., according to throttle setting. Rotation of the input member 228 also operates the variable displacement hydraulic module 240, pressurizing hydraulic fluid for circulation within the hydraulic circuit 244 according to valve setting commands received form the controller 156, creating the potential to rotate the intermediate member 234 using the fixed displacement hydraulic module 242. It is contemplated that the hydraulic circuit 244 be both reversible and throttled, the hydraulic circuit 244 thereby providing capability for speed trimming.

The hydraulic circuit 244 communicates pressurized hydraulic fluid to the fixed displacement hydraulic module 242 according to instructions received from the controller 156. The pressurized hydraulic fluid in turn rotates the intermediate member 234, and therethrough the ring gear 252, using the fixed displacement hydraulic module 242 at an intermediate member speed. The intermediate member rotational speed is summed with the rotational speed of the input member 228 by the intermeshing of the planetary gears 250, which rotate the planetary gear carrier 254 and therethrough the output member 214 at a rotational speed equivalent to the rotational speed of the input member 228 and the intermediate member 234. Manipulation of hydraulic fluid flow through the hydraulic circuit 244, in cooperation with the speed summing provided by the epicyclical gear arrangement 232, provides the variable gear ratio 116 (shown in FIG. 1) for compounding the internal combustion engine 10 (shown in FIG. 1) using the turbine 106 (shown in FIG. 1).

In certain embodiments the controller 156 can include a passive governor module configured to drive the output member 214 to a predetermined engine output shaft speed, such as in embodiments wherein the internal combustion engine 10 (shown in FIG. 1) is a constant speed internal combustion engine. In accordance with certain embodiments the controller 156 can include an active governor module configured to adjust the rotational speed of the output member 214 to the actual (or desired) speed of the engine output shaft 14 (shown in FIG. 1), such as in embodiments wherein the internal combustion engine 10 is a variable speed internal combustion engine.

Figure 4:
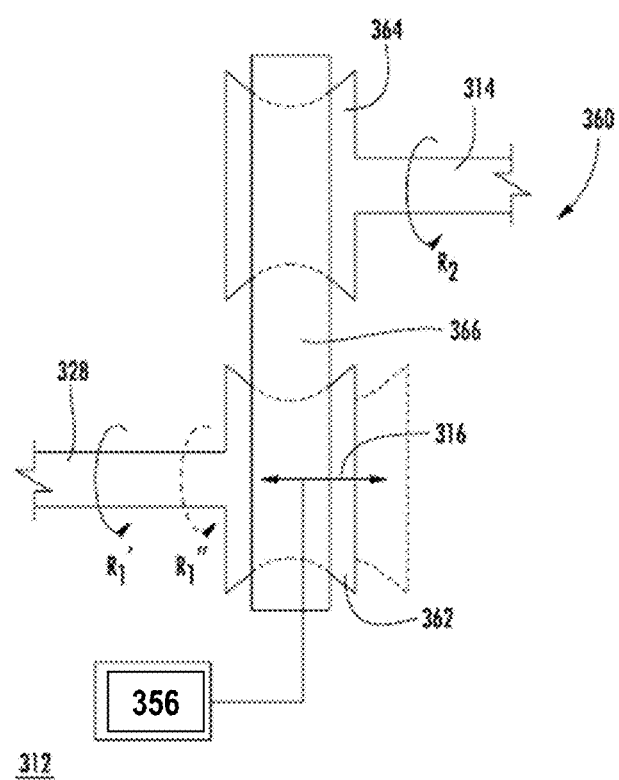
FIG. 4 is a schematic view of the compounding drive of FIG. 1 according to a further embodiment, showing a continuously variable transmission arrangement providing the variable gear ratio.

With reference to FIG. 4, a compounding drive 312 is shown. The compounding drive 312 is similar to the compounding drive 112 (shown in FIG. 1) and additionally includes a continuously variable transmission 360. The continuously variable transmission 360 connects an input member 328 with an output member 314. Connection is through an adjustable input sheave 362, which is fixed in rotation relative to the input member 328, an adjustable output sheave 364, which is fixed in rotation relative to the output member 314. A contoured belt 366 connects the adjustable input sheave 362 to the adjustable output sheave 364 for communication of the second recovered energy portion 40 from the interconnect shaft 110 (shown in FIG. 1) to the engine output shaft 14 (shown in FIG. 1).

Speed matching is accomplished by changing the effective operating diameter of either (or both) the adjustable input sheave 362 and the adjustable output sheave 364 using a governor module 356. During operation the working diameter of either (or both) the adjustable input sheave 362 and the adjustable output sheave 364 are adjusted to provide a variable gear ratio 316, which matches rotational speed of the output member 314 to rotational speed of the engine output shaft 14 (shown in FIG. 1) based on the rotational speed of the turbine 106 (shown in FIG. 1). It is to be understood and appreciated that the arrangement of the continuously variable transmission 360 shown in FIG. 4 is for illustration purposes only, and not for limitation, and that other arrangements are possible and remain within the scope of the present disclosure.

Figure 5:
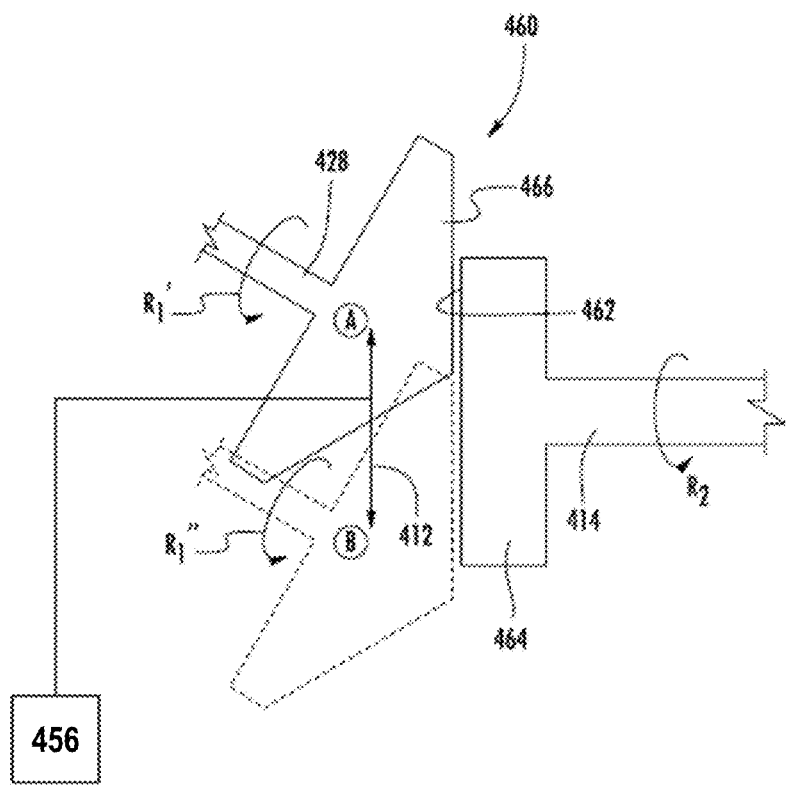
FIG. 5 is a schematic view of the compounding drive of FIG. 1 according to yet another embodiment, showing a traction drive arrangement providing the variable gear ratio.

With reference to FIG. 5, a compounding drive 412 is shown. The compounding drive 412 is similar to the compounding drive 112 (shown in FIG. 1) and additionally includes a traction drive assembly 460. The traction drive assembly 460 connects an input member 428 with an output member 414 using a variable interface surface 462 defined between a normal face 464 and an oblique face 466. The normal face 464 is fixed to one of the input member 428 and the output member 414, and the oblique face 466 is fixed to the other of the input member 428 and the output member 414. A governor module 456 is operably connected to one (or both) of the input member 428 and the output member 414 to translate one relative to the other, changing size of the interface surface 462, thereby alternating a variable gear ratio 416 of the compounding drive 412. It is to be understood and appreciated that the arrangement of the traction drive assembly 460 shown in FIG. 5 is for illustration purposes only, and not for limitation, and that other arrangements are possible and remain within the scope of the present disclosure.

Figure 6:
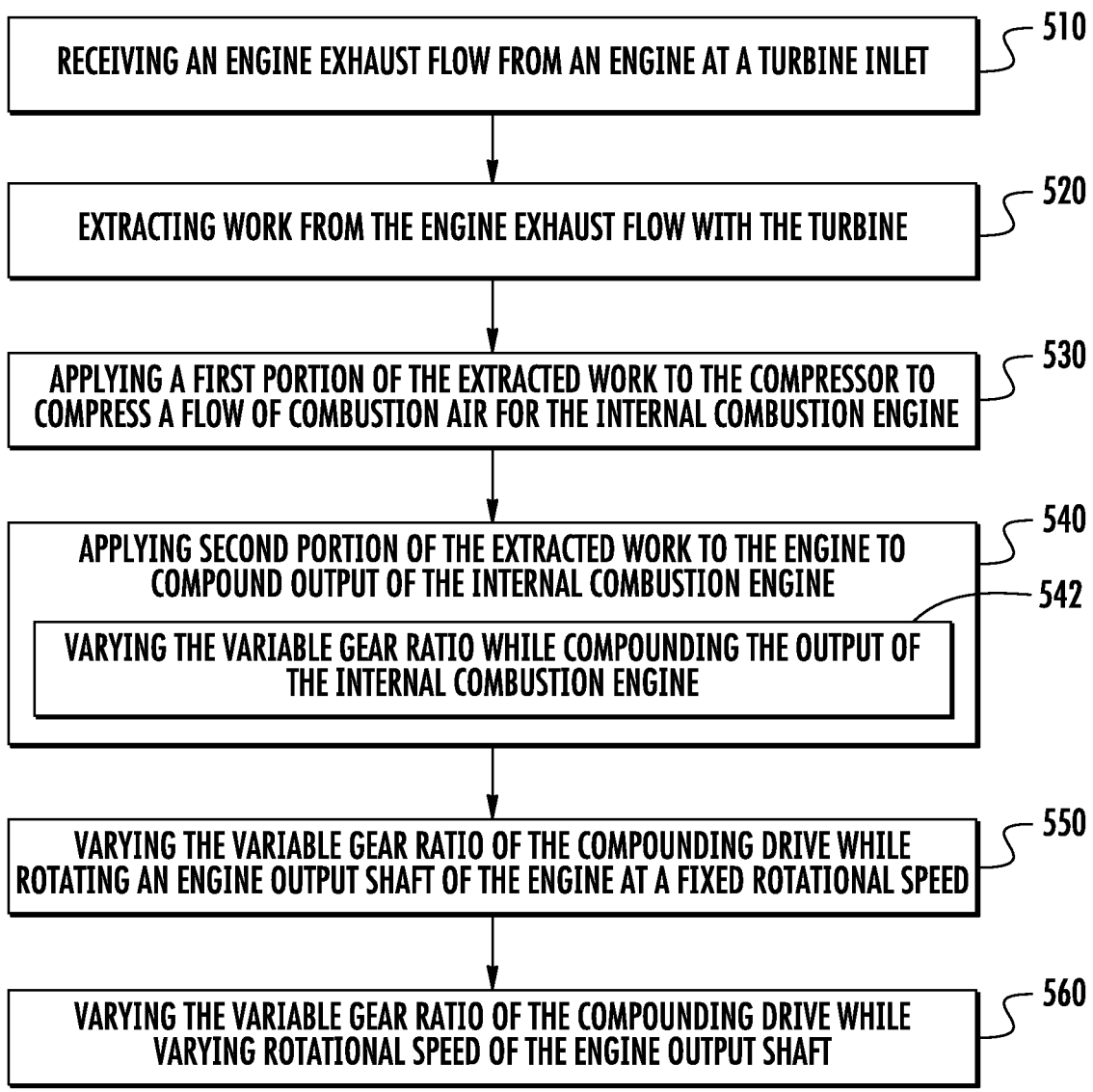
FIG. 6 is a schematic diagram of a method of compounding an internal combustion engine, showing operations of the method.

With reference to FIG. 6, a method 500 of compounding output of an internal combustion engine, e.g., the internal combustion engine 10 (shown in FIG. 1), is shown. The method 500 includes receiving an engine exhaust flow, e.g., the exhaust flow 22 (shown in FIG. 1) of the internal combustion engine 10 (shown in FIG. 1), as shown with box 510. The method 500 also includes extracting work, i.e., energy, from the received engine exhaust flow using a turbine, e.g., the turbine 106 (shown in FIG. 1), as shown with box 520.

The work extracted by the turbine from the exhaust flow is divided into a first extracted work portion and a second extracted work portion, as shown with box 530. The first extracted work portion is applied (communicated) to a compressor, e.g., the compressor 102 (shown in FIG. 1), for powering the compressor, as shown with box 530. The compressor compresses a flow of combustion air for the internal combustion engine, e.g., the compressed combustion air 20 (shown in FIG. 1), which is provided to the internal combustion engine, as also shown with box 530.

A second extracted work portion is applied (communicated) to the internal combustion engine, as shown with box 540. More specifically, as also shown with box 540, the second extracted work portion is applied to the internal combustion engine to compound output of the internal combustion engine. While the second extracted work portion is applied to compound output of the internal combustion engine a gear ratio used to apply the second extracted work portion is varied, as shown with box 542. In certain embodiments the gear ratio is varied while the internal combustion engine operates at a fixed engine speed, e.g., at a fixed rotational speed of the engine output shaft, as shown with box 550. In accordance with certain embodiments, the gear ratio can be varied while the internal combustion engine operates at a variable engine speed, e.g., at a variable engine output shaft rotational speed, as shown with box 560.

Turbo-compounded engines can employ piston (or other) engines with a turbine to recover energy from the exhaust, thereby improving fuel economy. This can be done, for example, by connecting a turbine to the engine pneumatically through engine exhaust and mechanically through a gearbox. While generally acceptable, such compounded engines can be difficult to implement in applications where the engine requires operational capability over a wide range of speeds and/altitudes, such as in aircraft, due to the difficulty in optimizing performance of the turbo-compressor across the operating range. One way to provide such capability is to employ fixed gear ratios and variable geometry on the turbomachinery.

In embodiments described herein fixed turbomachinery geometry and variable gear ratios between the engine and the turbo-compressor. In certain embodiments variable gear ratio is by provided through an epicyclical differential and a hydraulic pump/motor set. In accordance with certain embodiments the speed and direction of rotation of the hydraulic pump/motor provides a speed trimming function, and changes the apparent gear ratio of the overall assembly. In accordance with certain embodiments the variable gear ratio is provided using belt drive continuously variable transmission and/or a traction drive assembly. This can provide one or more of operability over relatively large speed, temperature, and altitude ranges. It can also provide a relatively simple mechanical arrangement in relation to variable turbomachinery geometries. Further, compounded engines employing turbo-compressors with variable gear ratios can be relatively lightweight, provide good reliability, and high efficiency in comparison to alternative variable ratio transmission architectures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An internal combustion engine, comprising:
an engine body supporting an engine output shaft and having a combustion air intake port and an exhaust port; and
an integrated turbo-compressor, comprising:
a compressor with a compressor outlet;
a turbine with a turbine inlet,
the turbine operatively connected to the compressor by an interconnect shaft; and
a compounding drive connected to the turbine and having a variable gear ratio and an output member,
wherein the variable gear ratio couples the turbine to the output member to compound output of the internal combustion engine using energy recovered from an exhaust flow received from the internal combustion engine,
wherein the compounding drive comprises:
an input member connected to the turbine;
the output member connected to the input member; and
an intermediate member connecting the input member to the output member through an epicyclical gear arrangement and a hydraulic pump/motor set;
wherein the compressor outlet is connected to the combustion air intake port,
wherein the turbine inlet is connected to the engine exhaust port, and
wherein an electric motor and battery arrangement is operatively connected to the engine output shaft in a hybrid-electric turbo-compounded engine arrangement, and
wherein;
the hydraulic pump/motor set comprises: a fixed displacement hydraulic module, wherein the input member operably connects the turbine to the fixed displacement hydraulic module; and a variable displacement hydraulic module in fluid communication with the fixed displacement hydraulic module via a hydraulic circuit, wherein the output member is operably connected to the hydraulic pump/motor set via the variable displacement hydraulic module, and wherein the variable displacement hydraulic module applies power through the output member according to a hydraulic fluid received through the hydraulic circuit; and
a controller operably connected to the hydraulic pump/motor set via the hydraulic circuit, wherein the controller is configured to throttle flow of the hydraulic fluid through the hydraulic circuit, to present rotation resistance to the input member via the epicyclical gear arrangement so that the output member rotates at a speed of the output shaft, to thereby match a compounding drive speed to the speed of the output shaft, whereby manipulation of hydraulic fluid flow through the hydraulic circuit, in cooperation with the epicyclical gear arrangement, provides a variable gear ratio for compounding the internal combine engine utilizing the turbine.

2. The engine of claim 1, wherein
the epicyclical gear arrangement is arranged within a housing, the epicyclical gear arrangement comprising:
a sun gear first in rotation relative to the turbine;
a ring gear extending about the sun gear;
a plurality of planetary gears intermeshed with the sun gear and the ring gear; and
a planetary gear carrier supporting each of the planetary gears for rotation independent rotation relative to one another,
the planetary gear carrier fixed in rotation relative to the output member;
wherein the sun gear, the ring gear, and the planetary gear carrier are each supported for rotation relative to the housing.

3. The engine of claim 1, wherein
the turbine has fixed turbomachinery geometry,
wherein the compressor has fixed turbomachinery geometry.

4. The engine of claim 1, wherein
the internal combustion engine is a constant speed turbo-compounded engine or
wherein the internal combustion engine is a variable speed turbo-compounded engine.

5. An aircraft carrying the engine of claim 1, wherein the turbo-compressor is operably connected to a rotor.

6. A method of compounding output from an internal combustion engine,
internal combustion engine including:
an engine body supporting an engine output shaft and having a combustion air intake port and an exhaust port; and
an integrated turbo-compressor, comprising:
a compressor with a compressor outlet;
a turbine with a turbine inlet,
the turbine operatively connected to the compressor by an interconnect shaft; and
a compounding drive connected to the turbine and having a variable gear ratio and an output member,
wherein the variable gear ratio couples the turbine to the output member to compound output of the internal combustion engine using energy recovered from an exhaust flow received from the internal combustion engine,
wherein the compounding drive comprises:
an input member connected to the turbine;
the output member connected to the input member; and
an intermediate member connecting the input member to the output member through an epicyclical gear arrangement and a hydraulic pump/motor set;
wherein the compressor outlet is connected to the combustion air intake port,
wherein the turbine inlet is connected to the engine exhaust port, and
wherein an electric motor and battery arrangement is operatively connected to the engine output shaft in a hybrid-electric turbo-compounded engine arrangement;

the hydraulic pump/motor set includes: a fixed displacement hydraulic module, wherein the input member operably connects the turbine to the fixed displacement hydraulic module; and a variable displacement hydraulic module in fluid communication with the fixed displacement hydraulic module via a hydraulic circuit, wherein the output member is operably connected to the hydraulic pump/motor set via the variable displacement hydraulic module, and wherein the variable displacement hydraulic module applies power through the output member according to a hydraulic fluid received through the hydraulic circuit; and a controller operably connected to the hydraulic pump/motor set via the hydraulic circuit, wherein the controller is configured to throttle flow of the hydraulic fluid through the hydraulic circuit, to present rotation resistance to the input member via the epicyclical gear arrangement so that the output member rotates at a speed of the output shaft, to thereby match a compounding drive speed to the speed of the output shaft, whereby manipulation of hydraulic fluid flow through the hydraulic circuit, in cooperation with the epicyclical gear arrangement, provides a variable gear ratio for compounding the internal combine engine utilizing the turbine; the method comprising:

receiving an engine exhaust flow from the internal combustion engine at the turbine inlet;

extracting work from the engine exhaust flow with the turbine;

applying a first extracted work portion to the compressor to compress a flow of combustion air for the internal combustion engine; and applying second extracted work portion to the internal combustion engine to compound output of the internal combustion engine, wherein applying the second portion of the extracted work includes varying the variable gear ratio while compounding the output of the internal combustion engine.

7. The method as recited in claim 6, further comprising varying the variable gear ratio of the compounding drive while rotating the engine output shaft of the internal combustion engine at a fixed rotational speed.

8. The method as recited in claim 6, further comprising varying the variable gear ratio of the compounding drive while varying rotational speed of the engine output shaft.

\* \* \* \* \*